Patented Sept. 7, 1954

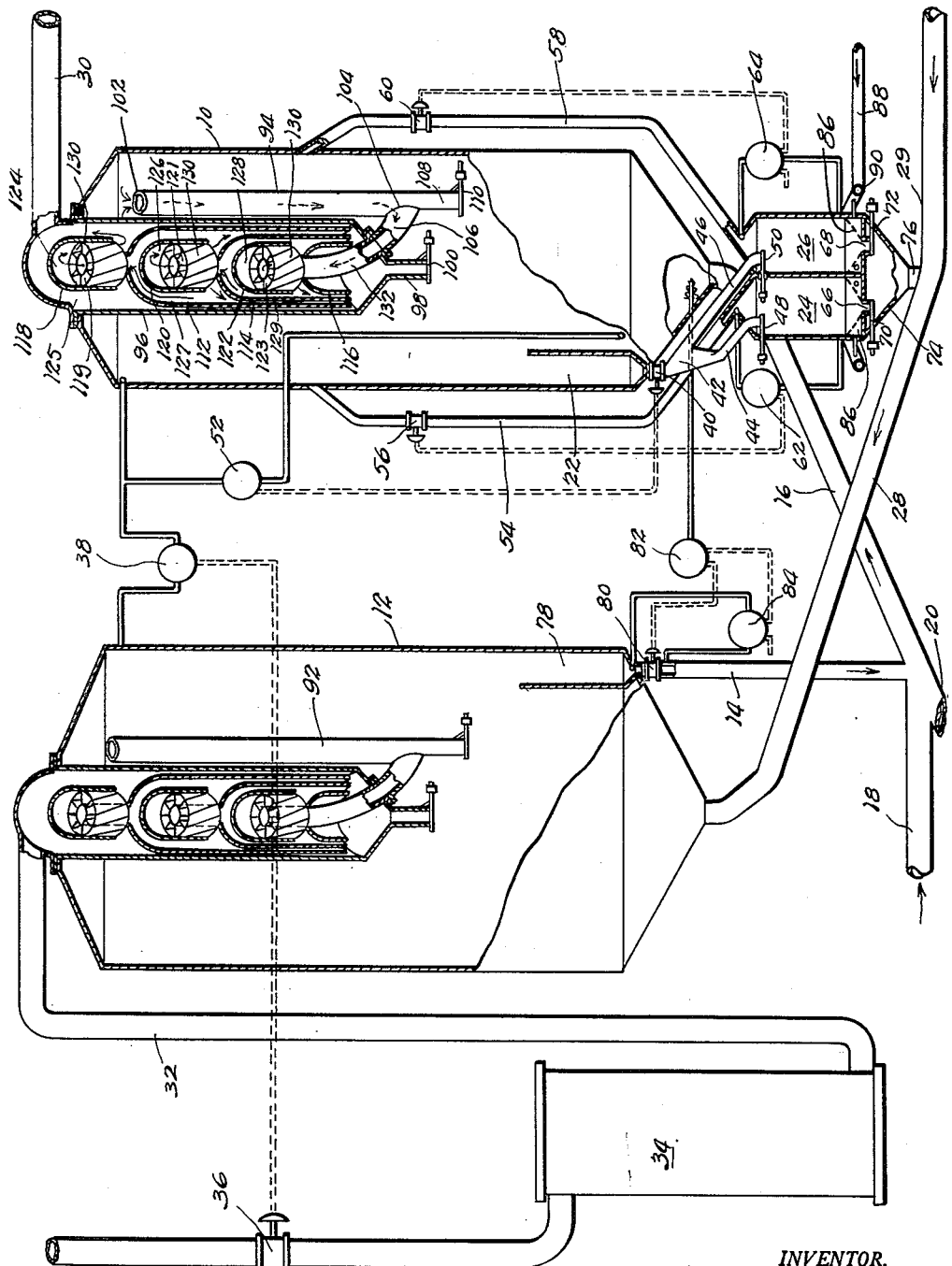

2,688,588

UNITED STATES PATENT OFFICE 2,688,588

PROCESS FOR HANDLING GAS-PARTICLE MIXTURES IN THE CATALYTIC CONVERSION OF HYDROCARBONS

Jon W. Beam, Cushing, Okla., assignor to Deep Rock Oil Corporation, Tulsa, Okla., a corporation of Delaware Application May 3, 1950, Serial No. 159,838

1 Claim. (Cl. 196—52)

This invention relates to a process and apparatus for handling mixtures of gases and particles and has for an object the provision of a method and apparatus for handling fluidized solids in gas-solids contact systems. This invention finds particular application in processes for the conversion of hydrocarbons by a fluidized catalyst technique.

In the operation of fluidized catalyst processes for the conversion of hydrocarbons, particularly cracking, it is the usual practice to operate the catalyst regenerator at a somewhat higher pressure than the hydrocarbon reactor. This has been found to be desirable since the efficiency of burning in the regenerator is increased by increasing the pressure of the regeneration gases and the efficiency of steam-stripping of catalyst withdrawn from the reactor is improved by lowering the pressure within the reactor. Thus in commercial operations it has been the practice to operate the regenerator at about 18 pounds per square inch gauge and to operate the converter or reactor and the catalyst stripping section at about 9 pounds per square inch gauge. The operation of the reactor at a different pressure than the converter gives rise to problems with respect to the necessary transfer of spent catalyst from the low pressure reactor to the high pressure regenerator. Several schemes have been tried which include mechanical screw conveyors for effecting the transfer of the catalyst from the low pressure zone to the high pressure zone. These mechanical devices have for the most part been abandoned because of problems incident to the erosion of mechanical equipment of this character. Accordingly it has not been feasible to construct a catalytic oil conversion plant utilizing a fluidized catalyst in which the reactor and the regenerator are placed in side by side relationship. The problem of transferring fluidized catalyst from the reactor to the regenerator has been practiced for the most part by locating the reactor above the regenerator so that the static head developed by the fluidized catalyst in the system will permit its transfer from the reactor maintained at low pressure to the regenerator maintained at a higher pressure.

The positioning of a large reactor over a large regenerator in a commercial plant gives rise to many problems of engineering and construction. For example, such structures are usually of the order of about 200 feet high and a great deal of expense is incurred in the suitable erection of such a structure including necessary elevators and supports and foundations that will support hundreds of tons of equipment. A tall structure of this character also presents many engineering problems with respect to expansion difficulties resulting from temperatures which will vary from atmospheric to well over 1000° F. Accordingly it has been recognized by the art that it would be desirable to locate the regenerator and the reactor at ground level if only means could be devised for efficiently cycling the catalyst from the reactor to the regenerator.

A further problem in connection with the operation of a hydrocarbon conversion process employing a fluidized catalyst is the recovery of catalyst and catalyst fines that are entrained in the gases or vapors passed from the reactor or the regenerator. In the past it has been proposed to employ various types of cyclone separators and electrostatic precipitators located either within or without the reactor or regenerator. Presently in use are the so-called multiclones or series buells. These devices are ordinarily positioned in the upper portions of the reactor and/or regenerator and serve to separate most of the catalyst particles and fines from the gases escaping from these vessels. However, their structure is such that they can be installed or replaced within the reactor or regenerator only with some difficulty because of expensive and slow welding work on internal braces and tube sheets and there exists a substantial item of repair or upkeep because of their relative inaccessibility.

Accordingly it is a further object of this invention to provide an efficient hydrocarbon conversion system employing a fluidized catalyst in which the reactor and regenerator may be operated at the desired pressures and may be positioned in side by side relationship at ground level.

A further object of this invention is the provision of a method and apparatus for transferring solid particles in a solid-gas contact system from a zone of lower pressure to a zone of higher pressure without using various mechanical devices such as screw conveyors and the like.

A further object of this invention is to provide a method and apparatus for disengaging gases from particles simply and efficiently.

A still further object of this invention is the provision of a gas-particle disengaging process utilizing apparatus which may be readily installed and removed from a reactor or regenerator vessel.

A still further object of this invention is the provision of a fluidized catalyst conversion system employing an efficient gas-solid catalyst disengaging means and a substantially foolproof catalyst transfer means for conducting fluidized catalyst from a reactor at low temperature to a regenerator at higher temperature.

Further and additional objects will appear from from the following description, the accompanying drawing and the appended claim.

In accordance with one embodiment of this invention, solid finely divided particles of a type that may be fluidized are transferred from a first zone of lower pressure to a second zone of higher pressure by the steps of flowing the particles from the first zone to a transfer chamber, passing a gas into the transfer chamber at a pressure higher than the pressure in the second zone, venting the gas from the transfer chamber while particle flow into it continues, then discontinuing the venting upon the accumulation of a predetermined amount of particles within the chamber and then pressure-discharging the the solid particles from the transfer chamber to the second zone of higher pressure.

As will be apparent as the description proceeds, this method of transferring solid particles has particular application in a hydrocarbon conversion process involving the use of a fluidized catalyst. In a process of this type the transfer chamber employed serves not only as means for pressurizing catalyst to the regenerator but also serves as means for simultaneously stripping the catalyst withdrawn from the reactor. If desired, a plurality of transfer zones may be associated with each reactor so that one transfer chamber is always receiving catalyst from the reactor while another transfer chamber is being discharged under pressure.

In another embodiment of this invention a method and apparatus have been provided for disengaging particles from a gas-particle suspension which comprises means for passing a gaseous stream containing the particles through a plurality of zones in which it is subjected to a series of successive reverse flows and spiral swirls. This treatment, by reason of the inertia of the particles and the centrifugal action, causes the particles to separate from the suspension. In each successive zone there is preferably an area of increased cross section resulting in a diminution of the rate of flow of gas, thereby tending to cause particles to settle out of the stream as the stream passes through the several zones. In one embodiment the apparatus for carrying out the contemplated method comprises a housing which is capable of being suspended through an opening in the upper end of a reactor or regenerator vessel. The housing has provided therein a plurality of coaxial shells nested within the housing and within each other in spaced relation, each shell having a lower open end and having an upper end terminating in an open-ended extension of reduced cross section. Inverted cap members or domes having closed upper ends and depending side walls are positioned over each extension and in spaced relationship thereto and to an adjacent shell, thus providing gas-receiving chambers and annular gas passageways. Within the annular passageway are provided a plurality of baffle elements for imparting a spiral swirl to a gas passing downwardly therethrough from a corresponding gas-receiving chamber. Thus a gas containing particles is passed successively through a plurality of gas-receiving chambers in which the direction of flow is reversed, and then through a plurality of annular passageways in which a swirl is imparted to the gas, whereby the particles are separated since their inertia causes them to collect on the side walls of the device whereafter they fall to the bottom thereof and are discharged back into the reactor or regenerator. The several shells within the housing are arranged in coaxial nesting and spaced relationship in order to make optimum use of the available space as will be apparent as the description proceeds.

For a more complete understanding of this invention, reference will now be made to the drawing which is a schematic view taken partially in section of an apparatus for cracking hydrocarbon oils in the vapor state by means of a fluidized catalyst. Only the reacting and regenerating sections of the device are shown, it being apparent that additional and auxiliary equipment, not here pertinent, may be employed in commercial practice.

The apparatus shown in the drawing comprises a reactor 10 and a regenerator 12 in which former a desired hydrocarbon cracking process is carried out in the presence of a fluidized catalyst, and in which latter the catalyst is regenerated by burning in the presence of a combustion-supporting gas. Regenerated catalyst is circulated from the regenerator 12 to the reactor 10 through a conduit 14 and a conduit 16. A fresh charge of hydrocarbons together with recycle stock and slurry from a slurry settler (not shown) is introduced into the system through a conduit 18 in admixture with injection steam introduced through conduit 20. The hydrocarbons are vaporized by the injection steam and the hot catalyst from conduit 16 and the resulting mixture of hydrocarbon vapors, injection steam and regenerated catalyst is passed together through conduit 16 to a lower portion of the reactor 10. The catalyst in the reactor 10 is cycled to a lower portion of the regenerator 12 through a suitable downcomer 22, a pair of transfer chambers 24 and 26 and a conduit 28. In the conduit 28 the catalyst is mixed with a stream of an oxidizing gas introduced through conduit 29 at about 20 pounds per square inch gauge and passed to the bottom of the regenerator 12 in accordance with the usual practice. Vapors and gases including conversion products are withdrawn from the reactor 10 through an outlet 30 from which they are passed to suitable fractionating equipment and other treating apparatus (not shown). The gases of combustion are withdrawn from the regenerator 12 through an outlet pipe 32 passing through a steam generator 34 and the pressure of the combustion gases in the regenerator is determined by a setting of a valve 36 controlled by a differential pressure-regulating instrument 38 which is adjusted in accordance with the pressure differential desired between the reactor 10 and the regenerator 12. In commercial operations for the catalytic cracking of hydrocarbons this pressure differential is about 9 pounds per square inch, the reactor operating at about 9 pounds per square inch gauge and the regenerator operating at about 18 pounds per square inch gauge.

In order to transfer the fluidized catalyst from the low pressure reactor 10 to the high pressure regenerator 12 and in order to strip the catalyst of volatile hydrocarbon materials, the catalyst is withdrawn from the reactor 10 through the downcomer 22, a slide valve 40 and a conduit 42 which is divided into two legs 44 and 46 in the manner indicated in the drawing. The conduits comprising the two legs 44 and 46 discharge respectively into upper portions of the two transfer chambers 24 and 26 and this discharge is controlled by weighted flapper valves 48 and 50. The slide valve 40 is controlled by a reactor level control instrument 52 which may be adjusted so that any desired level of fluidized catalyst may be maintained within the reactor 10.

The transfer chamber 24 is vented at its upper portion through a conduit 54 and a snap valve 56 to an upper section of the reactor 10. Likewise transfer chamber 26 is vented at its upper portion through a conduit 58 and snap valve 60 to an upper portion of the reactor 10. The venting snap valves 56 and 60 are respectively controlled by differential pressure type level controller devices 62 and 64 which latter are adjusted so that the valves 56 and 60 are normally open but snap shut when a predetermined quantity of fluidized catalyst has been discharged into either chamber 24 or 26 through legs 44 or 46, as hereinafter described.

The transfer chambers 24 and 26 have openings 66 and 68 adjacent the bottom ends thereof, said openings being controlled by flapper valves 70 and 72. These openings discharge into a hopper 74 which communicates through a spout 76 to the conduit 28 so that any catalyst discharged into the hopper 74 will be picked up by the regeneration gases introduced through the conduit 29 and passed to the regenerator 12 in the usual manner.

The lower portions of the transfer chambers 24 and 26 are provided with perforated plates 86 which may take the shape of funnels whereby any catalyst is directed toward the openings 66 and 68. A steam line 88 supplying a manifold 90 is provided whereby to introduce steam at about 40 pounds per square inch gauge into the transfer chambers 24 and 26 at a plurality of points beneath the perforated plates 86 so that the steam will pass up through the perforations in the plates 86 and maintain any catalyst that may be present in the transfer chambers 24 or 26 in the fluidized condition.

Circulation of the catalyst from the regenerator 12 through a downcomer 78 and the conduit 14 is controlled by a valve 80 which in turn is regulated by a temperature control device 82 and a differential pressure control device 84, as will be understood by those skilled in the art.

The operation of the apparatus thus far described is as follows: Injection steam, hydrocarbon oil vapors and regenerated catalyst are passed through conduit 16 into the bottom of the reactor 10 in which is maintained a fluidized bed of catalyst particles. The catalyst may comprise the usual type that is employed for operating a fluidized process, such as silica-alumina, silica-magnesia, activated clays, etc., which may be activated or promoted with other metal oxides as is well known in the art. Generally speaking, the level dividing the dense phase and the dispersed phase of catalyst in the reactor is controlled so that it is normally positioned just below the lowermost portion of a conduit 94 positioned in the upper portion of the reactor, the structure and operation of which will be more fully explained hereinafter. Likewise the level of catalyst in the regenerator is normally maintained just below the lowermost portion of a conduit 92. Inasmuch as the pressure in the regenerator 12 is higher than that in the reactor 10, there is no problem in obtaining the flow of catalyst into the reactor 10. Conversion temperatures for cracking in the reactor 10 are usually within the range of about 800° and 1050° F. and regeneration temperatures within the regenerator are usually within the range of about 1000° and 1200° F.

Spent catalyst is continuously withdrawn from the reactor 10 through the downcomer 22 and slide valve 40, the discharge through the valve 40 being controlled by the reactor level control instrument 52 so as to maintain the desired level of catalyst in the reactor at all times. Catalyst passing through valve 40 is discharged into conduit 42 and flows into leg 44, the lower end of which is normally held closed by a flapper valve 48. It will be noted that the conduit 42 and the legs 44 and 46 are so constructed that the catalyst will preferentially flow into leg 44 and cannot flow into leg 46 unless leg 44 is full of catalyst.

When a predetermined head of catalyst has been built up in the leg 44, then flapper valve 48 will open to discharge the catalyst into the transfer chamber 24. In the meantime steam is introduced into both of transfer chambers 24 and 26 under a pressure which is significantly higher than the pressure obtaining either in the reactor 10 or the regenerator 12, e. g. about 40 pounds per square inch. The steam passes upwardly through the perforations in plates 86 serving to fluidize and strip volatile hydrocarbons from any catalyst that is introduced into either of these transfer chambers. Steam from transfer chamber 24 is vented through conduit 54 and valve 56 into an upper portion of the reactor 10 above the normal level of the dense phase of the fluidized catalyst.

The flapper valve 70 at the bottom of the transfer chamber 24 is weighted so that it will not open solely by the hydrostatic head of the fluidized catalyst maintained within the transfer chamber 24. Thus catalyst flows by gravity into the transfer chamber 24 until a predetermined amount has accumulated therein as determined by the differential pressure type level control device 62 and during this time the steam continuously strips the catalyst introduced into the chamber. When the predetermined amount of catalyst, as determined by the device 62, has entered the transfer chamber 24, then the device 62 operates to snap the valve 56 to a closed position. When this happens, the back pressure now caused by the steam introduced into the transfer chamber 24 causes the flapper valve 48 to close, thus preventing the introduction of more catalyst into the transfer chamber. At the same time or upon the accumulation of additional pressure within the chamber 24 by reason of the steam continuously introduced, the weighted flapper valve 70 is forced open, thus causing the catalyst in the chamber 24 to discharge through the opening 66 into the hopper 74 from whence it is picked up by regeneration gases and discharged into the regenerator 12.

As the transfer chamber 24 is being discharged in the manner indicated, that is, while flapper valve 48 is closed, catalyst will build up within the leg 44 and after that leg has become full it will spill over into leg 46. The weight of the catalyst accumulating in the leg 46 will cause the flapper valve 50 to open and the catalyst will be discharged into the transfer chamber 26, the operation of which is the same as the operation of transfer chamber 24. Thus transfer chamber 26 provides means so that the withdrawal of catalyst from the reaction chamber can be substantially uninterrupted during operation. It will be noted that flapper valves 48 and 50 are weighted so as to require a predetermined head of catalyst to be built up within legs 44 and 46 before either can open. This requires the steam to vent from the transfer chambers 24 and 26 through the conduits 54 and 58, respectively.

It will be noted that although the stripping steam introduced into the transfer chambers 24 and 26 is at a relatively high pressure, perhaps 40 pounds per square inch, the volume is relatively small so that the steam which is vented to the reactor through the conduits 54 and 58 while valves 56 and 60 are still open is so small that it will not appreciably affect the pressure within the reactor. Likewise the volume of steam passed to the regenerator 12 while the transfer chambers are discharging is so small that it will not adversely affect the regeneration of the catalyst.

Thus it will be seen that an efficient method has been devised for transferring catalyst particles from a low pressure reactor to a higher pressure regenerator without employing mechanical devices such as screw conveyors and the like. The device is exceedingly simple in operation and requires little care or adjustment. An important feature of the device is that the transfer chambers also serve as stripping zones for the catalyst and the stripping steam provides the pressure for automatically discharging catalyst from the transfer chambers.

As previously indicated, one feature of this invention relates to means and methods for disengaging particles from the gases withdrawn from the reactor or the regenerator. In the drawing a device contemplated by this invention is shown associated with the upper ends of each of the reactor and the regenerator. However, inasmuch as the essential operation of both of these devices is the same, only the one contained within the reactor 10 will be specifically described.

The particle-disengaging means comprises a cylindrical housing 96 which may be removably secured through an upper opening in the top of the reactor 10. The housing 96 communicates with the effluent passageway 30 and is provided with a lower extension 98 having a reduced cross section with an opening in the bottom thereof controlled by a weighted flapper valve 100. The extension 98 and the flapper valve 100 serve to discharge back to the reaction zone any catalyst collected within the housing 96 as hereinafter described.

The conduit 94 having an upper open end 102 is secured to the housing 96 by any suitable means. The conduit 94 is provided with a reverse bend 104 adjacent the bottom thereof and communicates with the interior of the housing through an upwardly extending portion 106. Below the reverse bend 104 of the conduit 94 is an open-ended extension 108 controlled by a weighted flapper valve 110 which permits the catalyst collecting in the leg 108 to be discharged back to the reaction zone. Normally the level of the dense phase of the fluidized catalyst is maintained just below the flapper valves 100 and 110.

Within the housing 96 there is provided a plurality of inverted shells 112, 114 and 116. These shells are coaxially arranged in nested spaced relationship to themselves and to the side walls of the housing. Each of the shells 112, 114 and 116 has open lower end portions which terminate adjacent the bottom portion of the housing 96. Each of the shells is provided with open-ended extensions of reduced cross-sectional area adjacent the upper portions thereof and these open-ended extensions extend respectively into inverted caps or domes 118, 120 and 122. The caps have closed end portions and side walls depending over the respective extensions and in spaced relationship thereto to provide gas discharge chambers 124, 126 and 128 of increased cross-sectional area in which the flow of gases passing through the device is reversed in direction. The upwardly extending extensions are spaced from the side walls of the caps 118, 120 and 122 to provide annular passageways 119, 121 and 123 and the caps are also spaced from the shell next above likewise to provide annular passageways 125, 127 and 129 for the flow of gas. The annular passageways 119, 121 and 123 are provided with a plurality of inclined stationary baffle elements 130 which serve to impart a swirling motion to the gases which pass through these annular passageways.

The operation of the gas-particle disengaging device described immediately above is as follows: Gases and vapors resulting from the conversion of hydrocarbons in the reactor, as well as the injection steam and stripping gases introduced through conduits 54 and 58, pass to the top of the reactor 10 and into the conduit 94 through the upper opening 102. Even though the upper portion of the reactor chamber contains catalyst only in dispersed phase, there is still a considerable quantity of catalyst and catalyst fines contained within these vapors. The gaseous suspension descends through the conduit 94 to the return bend 104 at which location some of the catalyst is thrown out of the gas by its inertia. The catalyst which is thrown out collects in the leg 108 and is discharged back to the reaction zone through the flapper valve 110 only after it has built up to a predetermined amount within the leg 108. Because of the fact that there is always a predetermined amount of catalyst within the leg 108, no gases can escape through it back to the reactor. The gases still containing catalyst and catalyst fines then pass upwardly through the conduit 106 into a pipe 132 and into the upper extension of shell 116. The gases are axially injected into the chamber 128 where they are reversed in direction and passed downwardly through the annular passageway 123 between the cap 122 and the upper extension of the shell 116. While the gases are being passed through the annular pasageway 123, they are subjected to a swirling action by the fixed baffles 130. Any catalyst or catalyst fines that are separated from the gas at this stage of the operation drop down into the annular space between the lower portions of shell 114 and the shell 116. It is important to note that the flapper valve 100 in the bottom of the housing 96 is adjusted to remain closed until such time as the catalyst level within the housing extends somewhat above the lower open ends of the shells 112, 114 and 116. Thus catalyst falls downwardly below the cap 122 and collects in the bottom of the housing. The gases, partially freed of catalyst, cannot follow the downward course since their path is blocked by surplus catalyst contained within the housing above the lower ends of the shells. Therefore the gases still containing some catalyst and fines reverse their direction of flow and travel upwardly in the annular space 129 and through the upper extension of the shell 114 to the next successive chamber 126 wherein the direction of flow is again reversed to a downward direction. Thereafter the gas is swirled through annular passageway 121 and passes in a similar manner through passageway 127, chamber 124 and passageways 119 and 125 and finally out through conduit 30. The gas is thereby substantially freed of particles which are collected in the bottom of the housing 96 from which they are reintroduced into the reactor.

It will be noted that the device as depicted in the drawings subjects the gas in a short period of time to seven successive reversals including three swirls, whereby substantially all the catalyst and fines are removed therefrom before being discharged from the reactor. Also the velocity of the stream in the successive annular passageways continuously diminishes because of the increased cross-sectional areas thereof thereby facilitating the separation of the particles. While baffle elements 130 are employed to impart the desired swirling in the annular passageways 119, 121 and 123, they may be eliminated in some or all of these passageways. However, generally speaking, their presence is desired if maximum efficiency is to be achieved.

Thus it will be apparent that an efficient method has been provided for disengaging gases and particles. The device is comparatively simple in operation having no moving parts and may be readily installed in and removed from a reactor or regenerator when required.

The invention has been described in the foregoing with particular reference to a catalytic hydrocarbon cracking operation. The invention also has application in other hydrocarbon conversion processes employing a solid particulate catalyst and vaporous reactants, such as reforming, aromatization, isomerization, desulfurization, alkylation, etc. It is also useful in other processes involving steps of contacting materials in the gas and solid state, such as the Fischer-Tropsch synthesis and the like, as will be readily apparent to one skilled in the art.

While a particular embodiment of this invention is shown above, it will be understood, of course, that the invention is not to be limited thereto, since many modifications may be made, and it is contemplated, therefore, by the appended claim, to cover any such modifications as fall within the true spirit and scope of this invention.

I claim:

A process for the conversion of hydrocarbons employing a solid catalyst in the fluidized state circulated between a conversion zone of lower pressure and a regeneration zone of higher pressure which comprises maintaining a dense phase of catalyst in the fluidized condition in a lower portion of the conversion zone, gravity-flowing a stream of catalyst from said lower portion to a first transfer chamber, passing a stripping gas into a lower portion of said first transfer chamber and into a lower portion of a second transfer chamber at a pressure higher than said higher pressure, venting said stripping gas from upper portions of both of said transfer chambers into said conversion zone while catalyst flow into said first transfer chamber continues, discontinuing the venting from said first transfer chamber upon the accumulation of a predetermined amount of catalyst within said first transfer chamber, then diverting the flow of catalyst to said second transfer chamber, pressure-discharging said catalyst from said first transfer chamber by stripping gas pressure built up therewithin while the flow of catalyst to said second transfer chamber continues, discontinuing venting of stripping gases from said second transfer chamber upon the accumulation of a predetermined amount of catalyst therein, rediverting the flow of catalyst to said first transfer chamber, pressure-discharging said catalyst from said second transfer chamber by stripping gas pressure built up therewithin while the flow of catalyst to said first transfer chamber continues, transferring catalyst discharged from said first and second transfer chambers to said regeneration zone in a stream of regenerating gas, cycling regenerated catalyst with a vaporous charge stock from said regeneration zone to a lower portion of said conversion zone, withdrawing a stream of a mixture of stripping gas and vaporous hydrocarbon conversion products from an upper portion of said conversion zone, and subjecting said stream to a plurality of successive reverse flows and spiral swirls whereby to disengage catalyst from the mixture, and returning the disengaged catalyst to the conversion zone.

References Cited in the file of this patent

UNITED STATES PATENTS

| Number | Name | Date |
| --- | --- | --- |
| 1,188,768 | Hermansen | June 27, 1916 |
| 1,994,899 | Schaub | Mar. 19, 1935 |
| 2,419,088 | Putney | Apr. 15, 1947 |
| 2,435,158 | Read | Jan. 27, 1948 |
| 2,509,983 | Morrow | May 30, 1950 |
| 2,515,155 | Munday | July 11, 1950 |
| 2,517,900 | Loy | Aug. 8, 1950 |

FOREIGN PATENTS

| Number | Country | Date |
| --- | --- | --- |
| 174,788 | Great Britain | Feb. 9, 1922 |